March 12, 1963 J. P. EBERT 3,081,165
XEROGRAPHIC CHEMOGRAPHY
Filed Sept. 9, 1957
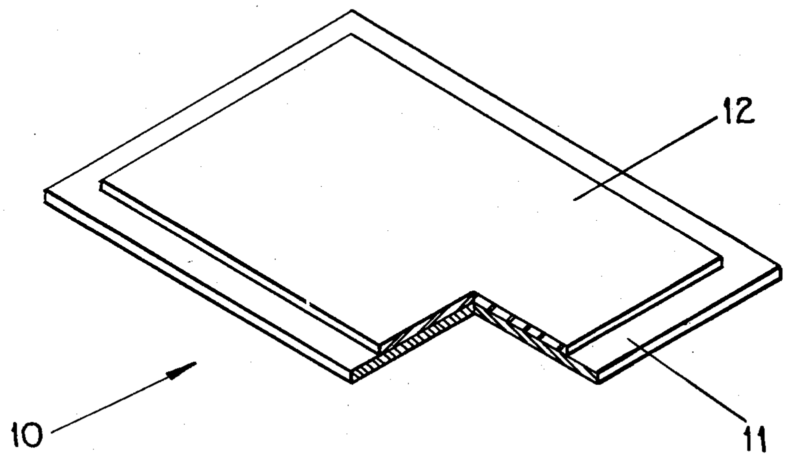
INVENTOR
JAMES P. EBERT
BY Frank A. Steinhilper
ATTORNEY United States Patent Office 3,081,165
Patented Mar. 12, 1963

3,081,165

XEROGRAPHIC CHEMOGRAPHY

James P. Ebert, Columbus, Ohio, assignor to Xerox Corporation, a corporation of New York Filed Sept. 9, 1957, Ser. No. 682,980
14 Claims. (Cl. 96—1)

This invention relates in general to xerography, and in particular relates to a new embodiment of xerography known herein by the name electrochemography.

In Carlson Patent 2,297,691 therein is disclosed the new process, now known by the name xerography, wherein an electrostatic latent image is formed and developed by means of an electroscopic material to yield a visible image capable of being employed for various purposes such as, for example, transfer to a surface to yield a xerographic print. According to one embodiment of the Carlson invention the electrostatic latent image is formed by deposition of an electrostatic charge on a photoconducting insulating surface, which charge is selectively dissipated by exposure to an optical or light image.

Now in accordance with the present invention, there is provided a further embodiment of the Carlson invention wherein an electrostatic latent image is formed by exposure of an electrochemographically sensitive surface or layer to yield a conductivity latent image adapted to produce an electrostatic latent image by selective dissipation of an electrostatic surface charge, either once or repetitively without the necessity for successive exposures to an optical image. According to one embodiment of the invention, a conductivity latent image of higher conductivity is imparted to an insulating layer by exposure to an optical image, whereupon an electrostatic charge or potential applied to the layer, either prior or subsequent to the exposure, is selectively dissipated to yield an electrostatic latent image usable according to methods of the Carlson patent or the like. According to another embodiment of the invention, a conductivity latent image is imparted to a semi-conductive layer by exposure to an optical image, yielding a latent conductivity image of lower conductivity whereby an electrostatic charge applied either prior to or subsequent to the exposure can be selectively dissipated to yield a developable and usable image.

Accordingly, it is an object of this invention to provide a new xerographic member comprising a conductive backing and a layer or coating thereon characterized by the ability to receive a conductivity latent image by a selective change in conductivity upon exposure to an optical or light image.

It is another object of this invention to provide an electrochemographically sensitive member comprising a conductive backing and an insulating layer thereon characterized by the ability to receive a conductivity latent image through a selective increase in conductivity upon exposure to an optical or light image.

It is still another object of the invention to provide an electrochemographically sensitive member comprising a conductive backing and a layer thereon of semi-conductive material characterized by the ability to receive a latent conductivity image through a selective decrease in conductivity upon exposure to an optical or light image.

It is a further object of the invention to provide apparatus utilizing an electrochemographically sensitive member to produce repetitively a plurality of xerographic prints corresponding to a desired optical or light image, such as, for example, a documentary or like original.

It is still a further object of the invention to provide a new process and apparatus for implementing electrochemography as evidenced by the formation and production of a conductivity latent image and to provide a process for producing and utilizing such conductivity latent images.

Additional objects of the invention will in part be obvious and will in part become apparent from the following specification and from the drawing in which:

The figure is a diagrammatic view of an electrochemographically sensitive member according to one embodiment of this invention.

According to the present new embodiment of xerography which embodiment is known herein under the name electrochemography, a new photosensitive member is employed in the formation and utilization of a conductivity latent image, which, upon full exposure, differs in conductivity by a factor of at least two as contrasted to other or unexposed areas, to produce an electrostatic latent image capable of utilization in xerography. Thus, for example, a conductivity latent image of increased conductivity may be formed in or on an insulating layer on a conductive backing member, which conductivity image upon charging the member serves to form an electrostatic latent image through the selective conductivity of the latent image. In this manner an insulating chemographic member according to this invention may have imparted to it a conductivity latent image by exposure to activating light whereby the conductivity of the insulating layer of the sensitive member is persistently or durably increased to permit selective dissipation of an electrostatic charge imposed either prior or subsequent to the exposure step. This conductivity latent image, being persistent, is particularly adapted to the repetitive making of xerographic prints through repeated cycles of charging, selectively dissipating the charge, and developing the resulting electrostatic latent image by usual methods. As desired, the resulting electrostatic image can be developed to yield either a photographically positive or a photographically negative electrophotographic or xerographic print, and thus, if desired, may be developed to yield a photographically positive print whereby the present process affords a new means for direct positive photographic duplication. According to a corollary embodiment of the present invention, a conductivity image of decreased conductivity or increased resistivity is imparted to a conductive or semi-conductive layer on a conductive backing, which latent image of decreased conductivity can be transformed into a visible image by the steps of charging and developing.

It is to be understood that the art of electrochemography, like the art of xerography, is particularly adapted to utilization in facsimile and like electrical apparatus and processes whereby the latent electrostatic image or, if desired, the conductivity latent image itself may be utilized in facsimile apparatus for the direct electrical recording or transmission of the signal corresponding to the latent image.

In the FIGURE there is illustrated a simple form of an electrochemographic plate according to one embodiment of this invention. This electrochemographic plate, generally designed 10, comprises a conductive backing member 11 having on at least one surface thereof a photosensitive layer 12 having the composition, properties and characteristics particularly adapted to the new art of electrochemography. The conductive backing member 11, is, generally speaking, a conductive support member characterized by being an electrical conductor and preferably having sufficient structural strength to support itself and the photosentive layer thereon. This backing member may be for example, a metallic plate, web, sheet, cylinder or appropriate structure having a regular surface adapted to receive a coating of photographic quality to record an optical or light image. The member may be metallic and thus formed of metals such as iron, steel, aluminum, brass, copper, zinc, and the like or, if desired, may be conductively coated or impregnated paper, plastic, resins, glass, or like conductive surface. Thus, paper or like felted cellulosic fibrous material stored under conditions of room humidity so as to have a moisture content of about 3% by weight constitutes a conductively impregnated paper suitable for use in the instant invention.

The photosensitive layer disposed on the surface of the conductive backing member is generically characterized by a persistent change in electrical conductivity when exposed to activating illumination. This may desirably be an insulating layer which is characterized by the ability to form a conductivity image upon exposure to light or may alternatively be a semiconductive layer characterized by the ability to form either a more conductive or a less conductive body upon exposure to activating illumination. Convenient photosensitive layers which are particularly adapted for easy and satisfactory coating on conductive backings may be in the form of plastic or resinous materials whereby they may be applied to the conductive surface by conventional operations such as, for example, brushing, spraying, dipping, and other coating operations as well as, if desired, vacuum evaporation or other means of deposition from vapor state. It is to be realized, however, that the invention is not necessarily limited to such plastic or resin-type photosensitive layers. The following detailed consideration of such layers is presented in illustration of particular types of photosensitive layers in accordance with one embodiment of the invention.

The photosensitive layer 12 on the backing member 11 according to one form of the invention may comprise generally a dielectric component preferably in the form of a film or matrix and acting both electrically as a dielectric and insulator and mechanically as a binder or the like, together with a second component or solvent and a third component or sensitizer. The dielectric component in general forms not only the major body of the photosensitive layer but also may establish the general electrical properties thereof. Thus, for example, according to one specific form of the invention, this dielectric component is an electrical insulator characterized by the ability to yield, under certain conditions hereinafter set forth, a portion or portions so modified as to be significantly more conductive than the original component. Desirably, this dielectric component has good film forming properties and is capable of adhering to the conductive backing member 11 to yield a structurally strong combination article. It preferably has the ability to retain within or upon itself an amount of solvent sufficient to operate in accordance with the art of electrochemography as will be hereinafter described and must be sufficiently compatible with the other components of the coating to form a suitable uniform article. Lastly, it should be capable of transmitting the amount of light required to bring about the chemical reactions or incipient chemical reactions which effect the change in conductivity of the combination composition. In some instances the dielectric matrix may be a solvent for the sensitizer, in which case, it either partially or wholly replaces or supplements the solvent component.

The principal requirement of the solvent is that it be capable of dissolving the dielectric material or dissolving therein and in general should be capable of serving as a reaction medium for the photochemical decomposition or reaction of the sensitizer. Desirably, it should be water resistant and characterized by not taking up or absorbing water or moisture to a degree impairing the operation of the article. Typically, the solvent may be a plasticizer (such as tricresyl phosphate, diocetyl phthalate or the like) for the dielectric material which frequently is a resin or a plastic film forming agent. Alternatively, it may be a member of the class of materials generally regarded as solids but being homogeneously compatible with the dielectric. It is to be realized, of course, that it may be water miscible to a sufficient extent so as to provide ionic charge carriers, and it may also contribute to overall sensitivity by itself yielding either such carriers or perhaps photochemical decomposition products.

The third general component of the photosensitive layer is the sensitizer, which desirably is a material in its original state not substantially interfering with the desired conductivity or receptivity of the entire article although frequently contributing thereto. When in solution or in suspension in the presence of the dielectric or the solvent, it is stable in the absence of activating illumination and relatively unstable in the presence of light. One example of such a compound is a p-bromo-benzene-dichlorosulfonamide. The sensitizer, too, desirably should not pick up sufficient water or moisture to interfere with the electrochemographic process. It is present in the composition in a proportion sufficient to modify the electrical properties of the matrix usually in an amount between about 1% and about 30% by weight based on the binder. The amount used may vary widely depending on the effect on the resistivity of the composite film, economics, sensitivity desired, etc. Thus, operable electrochemographic films have been prepared containing from about 0.1% to about 500% of sensitizer based on the weight of the binder. The use of accelerators or supersensitizing agents such as naphthalene, anthraquinone, etc. in suitable systems may permit even lower concentrations of sensitizers.

The combination photosensitive coating may be applied to the conductive backing by a number of methods. Included in these methods are dipping, spraying, rolling, brushing and the like. A particular method of applying the coating, which has the dual advantage of being simple to use in the formation of a high quality smooth layer and also being easily duplicated for the formation of comparable coatings for either production or comparative purposes, involves dissolving the component in a suitable solvent, placing this solution on the conductive backing member in a pool and rapidly rotating the member in a horizontal plane to cause the solution to flow out uniformly over the surface.

Typical examples of electrochemographic members prepared according to this invention are presented here for the purpose of illustration although it is to be clearly understood that these examples are illustrative and not limiting in nature and are not intended to limit the scope of the invention. Unless otherwise specified, in the following examples all electrochemographic plates were electrostatically charged using a corona discharge apparatus as described in U.S. 2,777,957 to L. E. Walkup; all viscosities were measured on a Brookfield Synchro-Lectric viscometer at about 25° C.; and all operations involving sensitized lacquers were carried out in the dark.

*Example 1*

A lacquer base was prepared by adding to toluene a rosin-modified phenol-formaldehyde resin available under the name Amberol F–71, employing the resin in an amount sufficient to yield a lacquer base having a specific gravity of 0.8957 at 30° C. compared to water at 30° C. and a viscosity of 2.2 centipoises at 30° C. using an Ostwald-Fenske, size 200, capillary pipette. This lacquer base was sensitized in the absence of illumination by adding thereto tri-iodo methane in the amount of 20 milligrams of tri-iodo methane per millileter of lacquer base.

Several 4" x 5" plates of aluminum were cleaned by swabbing with cotton soaked in toluene followed by vapor degreasing for one minute in isopropyl alcohol. A plate cleaned in this manner was mounted on a plate whirler and whirled at a speed of 75 r.p.m. whereupon 25 milliliters of the sensitized lacquer solution was carefully dropped at the center of the whirling plate from a pipette held with its tip 1½" above the center of the plate. With this whirling operation, the lacquer spread evenly over the entire surface of the plate and was allowed to dry in air to yield a dry, smooth and uniform film. With the exception of the speed, time and temperature of whirling, this method of cleaning the aluminum and applying the lacquer thereto was followed in each of the succeeding examples.

The electrochemographically sensitive member thus prepared was treated in darkness by corona charging methods to deposit an electrostatic charge potential on the photosensitive layer thereof, and according to arbitrarily fixed conditions, the member immediately after manufacture received and retained a potential of 440 volts positive polarity. The ability of the member to support an electrostatic charge potential on its surface increased somewhat with time to the extent that about 32 hours after manufacture it was capable of accepting a charge potential of about 545 volts positive polarity under the same conditions.

Similar electrochemographically sensitive members prepared by identical procedures and exposed to light after manufacture were characterized by the ability to accept a charge potential of 25 volts positive polarity, when the charging operation was carried out under the same conditions and within 5 seconds after exposure of the film to light. However, when the charging operation was carried out 30 minutes after irradiation of the member, the charge potential accepted by the member was 135 volts, this charge potential acceptance gradually increasing until, after 32 hours, the member was again capable of accepting a potential in the order of about 525 volts. The member manufactured according to this example, therefore, is characterized by the ability to accept and retain an electrostatic charge potential in the absence of illumination and to dissipate this charge when illuminated. The conductivity resulting in the dissipation of the charge endures for a period of several hours.

*Example 2*

A blend was prepared of 5% by weight tri-iodo methane in Amberol F–71 by melting the two materials together. The melted composition was spread on an aluminum plate such as employed in Example 1 and after being spread to substantial uniformity was allowed to cool.

Immediately prior to utilization of the thus prepared member, the coating of tri-iodo methane in the resin was exposed to vapors of toluene for 5 minutes. The solvent-impregnated member was then exposed to a light image or pattern followed by charging according to the conditions of Example 1. In the unexposed portions, the layer accepted a potential greater than 300 volts, and in the exposed portion the potential was less than 100 volts, thus yielding an electrostatic latent image capable of being developed by treatment with electroscopic material.

*Example 3*

A lacquer base was prepared by adding to xylene Amberol F–71 in an amount sufficient to yield a lacquer base having a viscosity of 30 centipoises. One gram of methylene iodide was dispersed in 50 milliliters of the lacquer. The lacquer was applied to two aluminum plates by whirling at 130° F. for 10 minutes at 60 r.p.m. The first plate was electrostatically charged, exposed to illumination from a photoflood light source for 30 seconds and the potential remaining on the plate then measured. The second plate was exposed to the light source for 30 seconds, then electrostatically charged using charging conditions identical to those used in charging the first plate. It was found that the plate which was not charged until after exposure had about 500 volts less charge in the exposed areas than did the plate which was charged prior to exposure thus showing that the sensitivity of the plate so tested was significantly greater when the exposure step preceded the charging step.

*Examples 4 Through 8*

A series of five chemographic plates were prepared as in Example 3 excepting that the xylene-Amberol F–71 lacquer had a viscosity of 26 centipoises. The plates differed only in the amount of methylene iodide sensitizer added to the lacquer solution. The amounts of methylene iodide added per 50 milliliters of lacquer were 0.02 gram, 0.10 gram, 0.50 gram, 2.5 grams and 12.5 grams, respectively. The lacquers were applied to aluminum bases as in Example 3. Each plate after preparation was cut into several sections and tested. The first section was electrostatically charged and the initial potential read. The second section was exposed to a carbon arc light source for 10 seconds and then charged and the potential read. The third section was exposed to the carbon arc light source for 20 seconds and then charged and the potential read. It was found that light sensitivity increased as the methylene iodide concentration increased from 0.02 gram to 2.5 grams but decreased when 12.5 grams of methylene iodide were present.

*Examples 9 Through 14*

A series of six chemographic plates were prepared by adding to carbon tetrachloride a phenol-formaldehyde resin available from the Rohm and Haas Company under the trade name Amberol M–88 and employing the resin in an amount sufficient to yield a lacquer base having a viscosity of 30 centipoises. The amounts of methylene iodide sensitizer added per 50 milliliters of lacquer were, respectively, 0.01 gram, 0.10 gram, 1.0 gram, 10.0 grams, 25.0 grams and 50.0 grams. The lacquer was applied to aluminum bases as in Example 3 except that the whirling temperature was about 80° F. The plates so prepared were cut into several sections and light sensitivity determined as in Examples 4 through 8. It was found that the light sensitivity increased as the concentration of methylene iodide increased.

*Examples 15 Through 18*

A series of four chemographic plates were prepared as in Example 3, each plate containing 0.5 gram of methylene iodide for 50 milliliters of Amberol F–71-xylene lacquer. The lacquers so prepared were coated on aluminum backing plates by whirling. The viscosity of each solution was varied in order to vary the resulting film thickness. After preparation the plates were sectioned and the thickness of the films measured. Light sensitivity was determined as in Examples 4 through 8 using a carbon arc light source for an exposure of 10 seconds with electrostatic charging after the exposure. Film thicknesses were 0.00045-inch, 0.00085-inch, 0.0013-inch and 0.00175-inch. Light sensitivity increased significantly as film thickness increased from 0.00045 to 0.00085; increased slightly for the next plate and then decreased significantly as thickness increased to 0.00175.

*Examples 19 Through 25*

A series of 7 chemographic plates were prepared using a lacquer base prepared by dissolving sufficient Amberol M–88 in toluene to give a viscosity of 25 centipoises. In Example 19, 50 milliliters of the lacquer were sensitized with 1 cc. of beta,gamma-dibromopropyl alcohol. In Example 20 the sensitizer was 1 cc. of 2,3-dibromopropene. In Example 21 the sensitizer was 1 cc. of methylene chloride. In Example 22 the sensitizer was one gram of iodoacetic acid. In Example 23 the sensitizer was one gram of 1,3,5-tribromobenzene. In Example 24 the sensitizer was one gram of bromoacetic acid and in Example 25 the sensitizer was one gram of chloroacetic acid. Electrochemographic plates were prepared from the sensitizers by whirling for 15 minutes at 60 r.p.m. on aluminum backed plates as in Example 3.

The plates so prepared were sectioned and light sensitivity determined by measuring initial potential on one section potential after a 30-second exposure to a carbon arc lamp followed by electrostatic charging and on another section with a 60 second pre-exposure before charging. Another section of each plate was exposed to a carbon arc light source through a positive photographic transparency containing a line-copy image, followed by electrostatic charging of the resulting conductive latent image to thereby create an electrostatic latent image, followed by development of the electrostaic latent image by contacting the electrostatic latent image with electrostatically-charged marking particles using the process described in U.S. 2,618,552 to E.N. Wise and known as "cascade development." All films showed light sensitivity. The best quality line copy images were obtained using the films of Examples 19 and 21. The images obtained in Examples 20, 22, 24 and 25 were of fair quality. The image obtained in Example 25 was particularly outstanding in that the image was negative, i.e., reversed in nature thus indicating that the resistivity of the film sensitized with chloroacetic acid had increased in resistivity on exposure to light. An electrometer scan was made of the plate and it was found that this was correct.

*Example 26*

A dielectric film was prepared by whirling a trichloroethylene solution of a copolymer hydrocarbon resin obtained from The Goodyear Rubber Company under the trade name Pliolite resin onto an aluminum backing. The plate so prepared was stored for about 5 months. A sensitizer solution was prepared by dissolving one gram of iodoform in 50 milliliters of xylene. This solution was flowed across the Pliolite film in the dark and then permited to dry. The film was then exposed to a photographic transparency using a carbon arc light source. The film was then electrostatically charged and the image made visible by cascade development. A good image was obtained.

*Example 27*

A lacquer base was prepared by adding sufficient polymethyl methacrylate to a one-to-one mixture of acetone and toluene to give a viscosity of 30 centipoises. The lacquer was sensitized by adding one gram of iodoform and coated on an aluminum backing by whirling. The resulting plate was found to function electrochemographically, that is, on exposure to light followed by electrostatic charging, an electrostatic latent image was obtained which could be developed using cascade development.

*Example 28*

An iodoform sensitized lacquer was prepared as in Example 27 by adding one gram of iodoform to a butyl alcohol solution of polyvinyl butyral having a viscosity of 30 centipoises. The lacquer was coated on an aluminum backing by whirling. As in Example 27, the resulting plate was found to function electrochemographically.

*Example 29*

An electrochemographic plate was prepared using an aqueous emulsion of polyvinyl acetate obtained from E. I. du Pont de Nemours and Co. under the trade name Elvacet. The emulsion had a viscosity of about 30 centipoises and was sensitized by adding thereto 0.03 gram of iodoform dissolved in ethanol. The emulsion was coated on an aluminum backing by whirling. When tested as in Example 27, the plate was found to function electrochemographically.

*Examples 30 Through 33*

A series of four electrochemographic plates were prepared by whirling a lacquer onto an aluminum base. In Example 30 the lacquer contained one gram of iodoform in 50 milliliters of a toluene solution of Amberol F–71 having a viscosity of about 30 centipoises. Example 31 contained one gram of methylene iodide in 50 milliliters of a toluene solution of Amberol F–71 having a viscosity of about 30 centipoises. In Example 32 one gram of methylene iodide was added to 50 milliliters of a toluene solution of chlorinated rubber obtained from the Hercules Powder Company under the trade name Parlon and having a viscosity of 30 centipoises. In Example 33 one gram of methylene iodide was added to 50 milliliters of a toluene solution of polystyrene having a viscosity of about 30 centipoises. Each of the electrochemographic plates so prepared was then sectioned.

The volume resistivity of exposed and unexposed sections was then determined using the following procedure. The chemographic film was electrically charged by corona discharge. The rate of decay of the film potential was measured with a vibrating probe electrometer and plotted against time. The volume resistivity, rho, was then determined from the equation:

$$\text{rho}=\frac{1.97t}{\log_{10} V_0-\log_{10} V_t}$$

where $V_0$ equals potential at time zero and $V_t$ equals potential after time $t$. The resistivity obtained is in ohms-cm., if time is in seconds and potential in volts. One section of each plate was then charged and its volume resistivity determined in the dark. Then, two sections were exposed to a light image using photoflood illumination through a positive transparency for a given number of seconds. In one section the volume resistivity was determined as described and in the other section the image was made visible using cascade development.

It was found that in the plate of Example 30 a legible image was obtained when the volume resistivity had changed from $7.0\times10^{15}$ ohms-cm. to $6.0\times10^{15}$ ohms-cm. The plate, however, contained appreciable background. An image free from background was obtained after an exposure equivalent to a change in volume resistivity of $7.0\times10^{15}$ ohms-cm. to $3.0\times10^{15}$ ohms-cm.

For the plate of Example 31 an image free from background was obtained after an exposure equivalent to a change in volume resistivity from $6.5\times10^{15}$ ohms-cm. to $2.4\times10^{15}$ ohms-cm.

The plates of Examples 32 and 33 were exposed using a carbon arc light source. In Example 32 an image free from background was obtained after an exposure equal to a change in volume resistivity from about $2.0\times10^{15}$ ohms-cm. to about $0.55\times10^{15}$ ohms-cm. In Example 33 the change in volume resistivity required to obtain a background-free image was from 0.85 to $10^{15}$ to $0.15\times10^{15}$ ohms-cm. Thus, legible images were obtained with a change in volume resistivity of only about 15%, while background-free images required a change in resistivtiy by a factor of 2.5 to 6.0 times depending on the nature of the electrochemographic film.

*Example 34*

The lacquer described in Example 1 comprising tri-iodomethane and Amberol F–71 in toluene was whirled onto a sheet of white paper and dried. The resulting plate was then exposed by contact to a photoflood lamp, projected through a photographic positive transparency. The uncoated side of the paper was then placed against a metal sheet which had been dipped in an aqueous solution of ammonium chloride. The electrochemographic film was electrostatically charged then developed using cascade development. The paper was stripped from the metal plate and heated to fuse the powder image to the plate. A good quality line copy image was obtained using this process.

*Example 35*

A lacquer base was prepared by adding to 50 milliliters of a toluene solution of Amberol F–71 having a viscosity of 30 centipoises, sufficient benzamide to form a saturated solution thereof. This lacquer was coated on an aluminum base by whirling. The electrochemographic film thus prepared was exposed to a line copy image by exposure to the illumination of a carbon arc through a positive photographic transparency followed by electrostatic charging and then developed using cascade development. A good quality positive powder image was obtained by this process.

*Examples 36 Through 39*

A lacquer base was prepared by adding to xylene sufficient Amberol F–71 to give a viscosity of 22.5 centipoises. To 50 milliliter portions of the base thus prepared were added two milliliters of bromoform (Ex. 36), 2 grams chloral stabilized with hydroquinone (Ex. 37), 2 grams chloral hydrate (Ex. 38), and 2 grams hexachloroethane (Ex. 39). The resulting sensitized lacquer solutions were coated on aluminum bases by whirling for five minutes at 40 r.p.m. at a temperature of 130° F. The resulting chemographic films were tested by exposing the film to a carbon arc light source through a photographic positive transparency. The plates were then electrostatically charged and developed using cascade development. Good quality powder images were obtained in each case.

*Example 40*

A lacquer base was prepared by dissolving sufficient polystyrene in toluene to give a viscosity of 30 centipoises. The lacquer was sensitized by adding one gram of iodoform to 50 milliliters of the lacquer solution. The sensitized lacquer was coated on an aluminum backing by whirling. The resulting film was exposed to a carbon arc through a positive photographic transparency. The film was then electrostatically charged and developed using cascade development to produce thereon a powder image. The powder image was transferred to a paper support using corona transfer as described in U.S. 2,576,047 to R. M. Schaffert and fused to the paper support by heating. The electrochemographic film was recharged, redeveloped and retransferred, all under subdued room illumination. In all, 40 copies of the original were produced from this single exposure using only hand-operated equipment. No decrease in image quality occurred while making these copies.

Although it is not intended to limit the scope of this invention by any reference to a particular theory or mechanism of operation, it is to be observed that the sensitizers employed are characterized by instability in the presence of light with the apparent release of ions. Photochemical decomposition of chemicals is a known phenomenon and is particularly associated with halogen-containing chemicals, and accordingly it is within the scope of the invention to employ, in addition to the sensitizers specifically described, other halogen-containing chemicals capable of dissociation upon illumination and including other iodine, chlorine, and bromine containing chemicals such as, for example, those which are well known to those skilled in the art such as the diiodide of tariric acid, p-bromobenzene-dichlorosulfonamide, etc. In addition to the halogen-containing compounds, other compounds known to those skilled in the art to be capable of dissociation upon illumination to yield ionic products may be used. Such compounds include suitable organo-metallic compounds such as tetraethyl lead, etc.; suitable organic peroxides and hydroperoxides with an appropriate activator; suitable nitrogen-containing organic compounds such as benzamide, etc.

A second observiation has been made, namely that the solvent is desirable not only as a convenient means of applying a mixture of the other components to the conductive surface, but additionally, as an apparent reaction medium for the sensitizer or for the sensitizer and film-forming agents. Thus, for example, it is known that a chemical reaction is possible between liberated iodine and the film-forming agent and may be encouraged by the presence of a mutual solvent, or at least that the solvent medium may assist in promoting dissociation of the sensitizer in the presence of light. The manner in which the solvent affects conductivity is unknown; it may function as what may be termed a conduction medium, or, by a more indirect mode of action, it may increase the internal molecular freedom of the system, thus selectively increasing the mobility of the charge carriers contributed by the iodine. Regardless of the way in which it enters the reaction, the "solvent," as the term is used herein, is believed to be essential for operable electrochemographic films. Thus, in the case of the member prepared according to Example 2, it could be observed that the member containing substantially no solvent was relatively stable even when illuminated but that after solvent treatment it was characterized by a high sensitivity to illumination as evidenced by the decreased conductivity when the solvent-moistened member was exposed to light or an optical image. In this connection it is observed that the solvent may be caused to be present during the exposure by either of two methods: first, by incorporation into the member during the initial preparation, or second, by subsequent addition of the solvent. In particular it is within the scope of the invention to employ a solvent during the preparation of the member and subsequently, to apply additional or different solvent to the member shortly prior to exposure. Likewise, of course, non-volatile solvents and, particularly, solid-phase solvents may advantageously be employed. The solvent need not be present in large quantities and it is not generally present in amounts sufficient to alter the physical properties of the layer to the extent of making it sticky or tacky.

With respect to the preservation of a sensitive member between its initial preparation and its final utilization, refrigeration generally improves the stability of the member as does the absence of reactive vapors or the like. Increased stability can be achieved by various appropriate methods.

Various methods may be employed to increase or decrease the light sensitivity of the photosensitive member. Thus, for example, if it be desired to produce a photosensitive member capable of use in subdued light and subject to conductivity changes only upon exposure to brilliant light or to light of selected spectral range, relatively small amounts of inhibitors may be added to the film composition and thus may decrease the rate of the photochemical iodine operation. On the other hand, if higher photograhpic speed is desired, small amounts of naphthalene in alcoholic solutions of ethyl iodide and similar accelerators serve to increase the rate of the photochemical iodine liberation. Similarly, spectral-sensitivity and to a large degree over-all sensitivity may be altered by appropriate selection of the components of the film. Thus, for example, films known to be relatively transparent or relatively opaque to visible light can be employed as components of the new product to control, alter, or vary the spectral sensitivity as desired. Likewise, solvents which are either better or poorer solvents for the ingredients, such as, particularly, the sensitizer, may be substituted for the purpose of controlling the amount of the sensitizer which is available in solution for the photochemical reaction thus affecting the relative speed of the reaction. In a different manner, mixed halogen compounds such as, for example, para-bromobenzene-dichloro-sulfonamide may liberate two or more different halogens under the action of light, thus affording sensitizers capable of entering into two photochemical reactions with the dielectric or film-forming material. As a further possible variation, it is observed that triiodo methane itself as well as other sensitizers according to this invention can undergo photochemical reactions wherein there is released not only the free halogen, but also a halogen acid. Thus, triiodo methane, as a typical example, is capable of yielding free iodine as well as hydriodic acid whereby at least two photochemical reaction products from the action of light on the sensitizer itself are available and capable of affording two forms of the halogen, either of which may lead to altered conductivity of the film.

It is to be particularly understood that certain additives may be incorporated in the photosensitive film for particular purposes as desired. Thus, for example, it is contemplated that pigment materials, fillers, and the like may be included in the photosensitive film to add body to the film, to alter or control its over-all conductivity or resistivity, or to provide color or opacity to the film for various reasons. As a specific illustration of this, it may be desired to employ a combination such as, for example, a conductively coated paper having a photosensitive layer thereon comprising at least a film forming adhesive dielectric material, a solvent, a sensitizer, and a white or colored pigment, whereby the photosensitive article not only is capable of receiving the image but also forms a white or colored backing material for a finished xerographic print. In the same manner it should be realized that certain additional layers either below, above, or between, may be employed in combination with the conductive backing and the photosensitive coating without departing from the scope of the invention.

As a corollary to the chemographic member particularly described hereinbefore, it is to be observed that an opposite type of member can be produced wherein exposure to light or to an optical image can result in decreased or selectively decreased conductivity. Such member, of course, is particularly suitable in combination with a film which, prior to any exposure to light, is a significant conductor of electricity, whereby an electrostatic charge potential imposed on such an unexposed member will be relatively quickly dissipated. Thus, for example, if a conductive or semi-conductive film contains as at least one of its conductivity agents a light unstable photosensitive compound such as, for example, a halogen containing compound characterized by conductivity and by instability in the presence of light, it is apparent that illuminating such a member will result in photo-decomposition whereby decreased conductivity can be achieved. In particular, an active agent such as a halogen in a chemically active and electrically conductive form may be incorporated together with a chemical intermediate compound capable of reacting with the halogen to yield an insulating material. Thus, a conductive halogen compound and a halogen receptive compound may be co-employed, whereby a photochemical reaction between the halogen compound and the halogen receptive compound yields an insulating halogenated hydrocarbon, resin, plastic or the like.

In co-operation with any or all of the electrochemographic members prepared according to the present invention, this invention also contemplates a new embodiment of xerography comprising forming a persisting conductivity latent image overlying a conductive surface, imposing an electrostatic charge potential on such conductivity latent image, dissipating the electrostatic charge potential through the conductivity image to yield an electrostatic latent image, developing such electrostatic image by treatment with electroscopic materials whereby there is formed a valuable and usable visible image of the electroscopic material conforming to the conductivity latent image and thereby conforming to the image employed for exposure.

This application is a continuation-in-part of my earlier filed co-pending application Serial No. 359,851, filed on June 5, 1953, now abandoned.

I claim:

1. A method of xerography comprising forming a persistent image of electrical conductivity by first exposing to a pattern of light and shadow to be recorded a photosensitive member comprising an electrically conductive backing having a photosensitive layer thereon and in electrically conductive contact with at least one surface thereof, said photosensitive layer undergoing persistent change in electrical conductivity upon illumination, the layer consisting essentially of an organic resin binder having high electrical resistivity, a solvent for said binder and between about 1 to 30% based on the weight of the binder of a sensitizer, the sensitizer being a photolytic organic compound selected from the group consisting of tri-iodo methane, methylene iodide, beta, gamma-dibromopropyl alcohol, 2,3-dibromopropene, methylene chloride, iodoacetic acid, 1,3,5-tribromobenzene, bromoacetic acid, chloroacetic acid, benzamide, tribromo methane, chloral, hexachloroethane, the di-iodide of tariric acid and parabromo benzene-dicloro-sulfonamide, said exposure creating changes in electrical conductivity in the layer of at least two times as a result of photolysis in said photosensitive layer, then forming an image of electrostatically attractable material by applying electrostatic charges to the photosensitive layer to form an electrostatic charge pattern thereon corresponding to the changes in electrical conductivity therein and attractively depositing finely-divided particles of electrostatically attractable material in conformity with said charge pattern.

2. A method of xerography comprising forming a persistent image of electrical conductivity by first exposing to a pattern of light and shadow to be recorded a photosensitive member comprising an electrically conductive backing having a photosensitive layer thereon and in electrically conductive contact with at least one surface thereof, said photosensitive layer undergoing persistent change in electrical conductivity upon illumination, the layer consisting essentially of an organic resin binder having high electrical resistivity, a solvent for said binder and between about 1 to 30% based on the weight of the binder of a sensitizer, the sensitizer being a photolytic organic compound selected from the group consisting of tri-iodo methane, methylene iodide, beta, gamma-dibromopropyl alcohol, 2,3-dibromopropene, methylene chloride, iodoacetic acid, 1,3,5-tribromobenzene, bromoacetic acid, chloroacetic acid, benzamide, tribromo methane, chloral, hexachloroethane, the di-iodide of tariric acid and parabromo benzene-dicloro-sulfonamide, said exposure creating changes in electrical conductivity in the layer of at least two times as a result of photolysis in said photosensitive layer, applying electrostatic charges to the photosensitive layer to form an electrostatic charge pattern thereon corresponding to the changes in electrical conductivity therein, attractively depositing finely-divided particles of electrostatically attractable material in conformity with said charge pattern, transferring said marking particles in image configuration to a support base and then repeating sequentially the steps of electrostatically charging, contacting with marking particles and transferring said marking particles to a support base a plurality of times whereby the change in conductivity in said layer persisting after exposure produces a plurality of copies from the single exposure to the pattern of light and shadow.

3. A method of xerography comprising forming an image of electrical conductivity by exposing to a pattern of light and shadow to be recorded a photosensitive member comprising a photosensitive layer which undergoes a persistent change in electrical conductivity upon illumination, the layer consisting essentially of an organic binder having high electrical resistivity, a solvent for said binder and between about 1 to about 30% based on the weight of the binder of a sensitizer, the sensitizer being a photolytic organic compound selected from the group consisting of tri-iodo methane, methylene iodide, beta, gamma - dibromopropyl alcohol, 2,3 - dibromopropene, methylene chloride, iodoacetic acid, 1,3,5-tribromobenzene, bromoacetic acid, chloroacetic acid, benzamide, tribromo methane, chloral, hexachloroethane, the di-iodide or tariric acid and parabromo benzene-dichlorosulfonamide, said exposure creating changes in electrical conductivity in the layer of at least two times as a result of photolysis in said photosensitive layer, and forming an image of electrostatic charges conforming to said light and shadow pattern developable with electrostatically attractable marking material by applying electrostatic charges to the photosensitive layer to form the electrostatic charge pattern thereon corresponding to the changes in electrical conductivity therein.

4. A method in accordance with claim 3 in which said electric field is applied through the photosensitive layer by charging the photosensitive member with corona after exposing said photosensitive member to the pattern of light and shadow.

5. A method in accordance with claim 3 in which said electric field is applied through the photosensitive layer by charging the photosensitive member with corona prior to exposing said photosensitive member to the pattern of light and shadow.

6. A method in accordance with claim 3 including developing said image of electrostatic charges by selectively attracting electroscopic material to said photosensitive member in conformity with said pattern of light and shadow and fixing the developed image on said photosensitive member.

7. A method in accordance with claim 3 including developing said image of electrostatic charges by selectively attracting electroscopic material to said photosensitive member in conformity with said pattern of light and shadow, and then transferring the developed image from said member to a new support base.

8. A method of xerography comprising forming a persistent image of electrical conductivity by exposing to a pattern of light and shadow to be recorded a photosensitive member comprising a photosensitive layer which undergoes a persistent change in electrical conductivity upon illumination, the layer comprising a binder having high electrical resistivity and a sensitizer dispersed therein, the sensitizer being a photolytic organic compound, said exposure creating persistent changes in electrical conductivity in the layer of at least two times as a result of photolysis in said photosensitive layer in areas exposed to light, applying an electric field through the photosensitive layer to form an electric field pattern thereon in correspondence with changes in electrical conductivity therein, forming a first developed image of electrostatically attractable material by selectively depositing electroscopic material in conformity with said field pattern, and then in the absence of any further exposure, forming a second developed image conforming to said persistent changes of electrical conductivity by again applying an electric field through the photosensitive layer to again form an electric field pattern thereon in correspondence with said persistent changes in electrical conductivity as a result of the photolytic material retaining the change in conductivity in those areas which were originally exposed to light and forming said second developed image by selectively depositing electroscopic material in conformity with said field pattern.

9. A method in accordance with claim 8 in which solvent is first applied to said photosensitive layer and is applied just prior to carrying out the remaining manipulations.

10. A method in accordance with claim 8 in which said electric field is applied through the photosensitive layer by applying corona discharge to the surface of said photosensitive layer.

11. A method in accordance with claim 8 in which said photosensitive layer includes a solvent for said binder.

12. A method in accordance with claim 8 in which said first developed image on said layer is transferred prior to forming said second developed image.

13. A method in accordance with claim 8 in which the electric charge pattern for development of said first developed image is formed by applying an electric field through said photosensitive layer by applying corona discharge to the surface of said photosensitive layer prior to exposure of said photosensitive member.

14. A method in accordance with claim 8 in which the electric charge pattern for development of said first developed image is formed by applying an electric field through said photosensitive layer by applying corona discharge to the surface of said photosensitive layer after exposure of said photosensitive member and prior to developing by depositing electroscopic material.

References Cited in the file of this patent

UNITED STATES PATENTS

| | | |
|---|---|---|
| 1,574,357 | Beebe et al. | Feb. 23, 1926 |
| 1,902,213 | Brockway | Mar. 21, 1933 |
| 2,297,691 | Carlson | Oct. 6, 1942 |
| 2,663,636 | Middleton | Dec. 22, 1953 |
| 2,692,178 | Grandadam | Oct. 19, 1954 |
| 2,744,859 | Rines | May 8, 1956 |
| 2,756,676 | Steinhilper | July 31, 1956 |
| 2,845,348 | Kallman | July 29, 1958 |

OTHER REFERENCES

Petrikaln: Zeitschrift für Physikalische Chemie, vol. 10B, pp. 9–21 (1930).

Vartanian: Acta Physiochimica U.R.S.S., vol. XXII, No. 2, pp. 201–224 (1947).

The Merk Index, 6th ed., Merk & Co. (1952), pp. 810–811.

Wainer: "Phosphor-Type Photoconductive Coatings for Continuous Tone Electrostatic Electrophotography," Photographic Engineering, vol. 3, No. 1 (1952).

The Merck Index, 6th ed. (1952), pp. 126 under "Benzidine," page 825 under "Quinone"; page 810–811.